United States Patent
Lidón

(10) Patent No.: US 12,190,615 B2
(45) Date of Patent: Jan. 7, 2025

(54) SYSTEM AND METHOD FOR TRANSMITTING COLOR AND DEPTH INFORMATION

(71) Applicant: TMRW Foundation IP S. À R.L., Luxembourg (LU)

(72) Inventor: Jesús Manzanera Lidón, Elche (ES)

(73) Assignee: TMRW FOUNDATION IP S.ÀR.L., Luxembourg (LU)

( * ) Notice: Subject to any disclaimer, the term of this patent is extended or adjusted under 35 U.S.C. 154(b) by 146 days.

(21) Appl. No.: 17/876,227

(22) Filed: Jul. 28, 2022

(65) Prior Publication Data
US 2024/0037966 A1 Feb. 1, 2024

(51) Int. Cl.
| | | |
|---|---|---|
| G06V 20/64 | (2022.01) | |
| G06T 9/00 | (2006.01) | |
| G06V 10/24 | (2022.01) | |
| G06V 10/26 | (2022.01) | |
| G06V 40/16 | (2022.01) | |
| H04N 5/265 | (2006.01) | |
| H04N 23/45 | (2023.01) | |

(52) U.S. Cl.
CPC .............. *G06V 20/64* (2022.01); *G06T 9/001* (2013.01); *G06V 10/24* (2022.01); *G06V 10/267* (2022.01); *G06V 40/172* (2022.01); *H04N 5/265* (2013.01); *H04N 23/45* (2023.01)

(58) Field of Classification Search
USPC ................................. 382/103, 166, 232–233
See application file for complete search history.

(56) References Cited

U.S. PATENT DOCUMENTS 10,757,410 B1 * 8/2020 Hoppe ................. H04N 19/176
2020/0394848 A1 * 12/2020 Choudhary ............... G06T 7/50

FOREIGN PATENT DOCUMENTS

CN 113689365 A 11/2021

OTHER PUBLICATIONS

Maceira et al., Fusion of colour and depth partitions for depth map coding, 2013 IEEE 978-1-4673-5807-1/13, pp. 1-7. (Year: 2013).*
Sharp, "Accurate, Robust, and Flexible Real-time Hand Tracking", Proceedings of the 33rd Annual ACM Conference on Human Factors in Computing Systems, ACMPIB27, New York, NY, Apr. 18, 2015, pp. 3633-3642.

* cited by examiner

*Primary Examiner* — Ishrat I Sherali
(74) *Attorney, Agent, or Firm* — BRYAN CAVE LEIGHTON PAISNER LLP

(57) ABSTRACT

A system for transmitting color and depth information, comprising: an image capturing device capturing a full color image frame of a scene; a depth capturing device capturing a grayscale depth image frame of the scene; a target identifying module for identifying a target in the scene; a bounding box generator configured for generating a bounding box encapsulating the target and for creating bound grayscale depth images and bound full color images; a depth colorizer converting the bound grayscale depth images into a bound full color depth image by linking and normalizing the depth dimension of the bounding box to a transferred color gamut by implementing a transfer function; an image merger that merges the bound full color images and bound full color depth images together into bound merged full color images; and an image encoder compressing the bound merged full color images into an image bitstring.

16 Claims, 11 Drawing Sheets
(7 of 11 Drawing Sheet(s) Filed in Color)

SYSTEM AND METHOD FOR TRANSMITTING COLOR AND DEPTH INFORMATION

FIELD

The present disclosure relates to a system and method for transmitting color and depth information.

BACKGROUND

During the capturing of a target in a scene use is generally made of an image capturing device and a depth capturing device. The image capturing device captures the color information of the target, while the depth capturing device captures the range or depth information of the target. Current depth capturing devices capture the depth of a whole scene and do not focus on a specific target.

SUMMARY

It is an object of this disclosure to mitigate shortcomings pointed out above. Described embodiments involve capturing color information and depth information, and involve identifying a target and focusing the depth measurements on the identified target.

In one aspect of the current disclosure, a system for transmitting color and depth information is provided, comprising: an image capturing device (e.g., a digital camera) configured to capture a full color image frame of a scene; a depth capturing device (e.g., a depth camera) configured to capture a grayscale depth image frame of the scene; and at least one computing device comprising a processor and memory, the at least one computing device being programmed to perform steps including identifying a target in the scene; generating a bounding box encapsulating the target, the bounding box having a depth dimension; applying the bounding box to the grayscale depth image to create a bound grayscale depth image and to the color image frame to create a bound color image; converting the bound grayscale depth image into a bound color depth image by linking and normalizing the depth dimension of the bounding box to a transferred color gamut by implementing a transfer function; merging the bound color image and the bound color depth image together into a bound merged color image, the bound merged color image containing information that is focused on the target; and encoding the bound merged color image into an image bitstring.

In some embodiments, the at least one computing device is further programmed to generate a plurality of bounding boxes and to create a collage of images by merging the bounding boxes; to generate the color gamut and to generate the transfer function that is used to generate, from the bound grayscale depth images, the bound color depth images; to use target key points of the target when generating the transfer function; or to crop the bound grayscale depth image and the bound color images.

In some embodiments a system includes, as software implemented by a computing device or as dedicated computing hardware, a target identifying module for identifying a target in the scene; a bounding box generator configured for generating a bounding box encapsulating the target, the bounding box having a depth dimension, and for creating bound grayscale depth images and bound full color images; a depth colorizer for converting the bound grayscale depth images into a bound full color depth image by linking and normalizing the depth dimension of the bounding box to a transferred color gamut by implementing a transfer function; an image merger that merges the bound full color images and bound full color depth images together into bound merged full color images, the bound merged full color images containing information that is focused on the target; and an image encoder compressing the bound merged full color images into an image bitstring.

In some embodiments, the system further comprises a color gamut generator configured to generate the color gamut as well as a transfer function generator configured to generate the transfer function that is used by the depth colorizer to generate, from the bound grayscale depth images, the bound full color depth images. In further embodiments, the system comprises an additional combined image merger located between the image merger and the image encoder so that if more than one bounding box is created, the combined image merger creates a collage of images by merging the bounding boxes. In yet further embodiments, the transfer function generator uses target keypoints of the target when generating the transfer function.

In some embodiments, the bounding box adapts dynamically according to the size, shape and orientation of the target. In these embodiments, the transferred color gamut accordingly adapts by altering in length to stay normalized along the depth dimension, and the transfer function is adjustable and also adjusts to provide for the change in depth dimension so that the depth dimension of the target is substantially covered by the transfer function and transferred color gamut. In further embodiments, the transfer function is adjustable by varying the gradient of the function.

In some embodiments, the transfer function is a continuous bijective or invertible function.

In some embodiments, the transfer function is implemented by a generalized logistic function.

In some embodiments, the target is a person comprising a face and a torso or the full body of a person.

In some embodiments, the system further comprises a bounding box applier that encapsulates the target with the bounding box and creates the bound grayscale depth images and bound full color images.

In another aspect of the current disclosure, a system for receiving color and depth information comprises at least one computing device comprising a processor and memory, the at least one computing device being programmed to perform steps including receiving an image bitstring; decoding the image bitstring into a bound merged color image, wherein the bound merged color image includes a bounding box that encapsulates a target; unmerging the bound merged color image into a bound color image and a bound color depth image; converting the bound color depth image into a bound grayscale depth image; and reconstructing the target using the bound color image and the bound grayscale depth image.

In some embodiments, the at least one computing device is further programmed to receive transfer function metadata, a color gamut and bounding box metadata, to use the received transfer function metadata, the color gamut and the bounding box metadata to turn the bound color depth images into bound grayscale depth images; and to reconstruct the target by using the bound color image and the bound grayscale depth image and the received bounding box metadata.

In some embodiments, the image bitstring comprises a collage of merged bounded images, and the at least one computing device is further programmed to receive bounding box metadata and unmerge the collage of bound images into separate bounding boxes with the use of the received bounding box metadata.

In some embodiments, a system includes as software implemented by a computing device or as dedicated computing hardware a video decoder configured for receiving an image bitstring, the video decoder decoding the image bitstring into a bound merged full color image; an image unmerger configured for unmerging the bound merged full color image into a bound full color image and a bound full color depth image; a depth decolorizer configured for converting the bound full color depth image into a bound grayscale depth image; and a target reconstructor configured for reconstructing the target by using the bound full color image and the bound grayscale depth image.

In some embodiments, the depth decolorizer is capable of receiving a transfer function metadata, a color gamut and bounding box metadata and wherein the depth decolorizer uses the received transfer function metadata, a color gamut and bounding box metadata to turn the bound full color depth images into bound grayscale depth images; and wherein the target reconstructor receives bounding box metadata and reconstructs the target by using the bound full color image and the bound grayscale depth image as well as the received bounding box metadata. In further embodiments, the image bitstring comprises a collage of merged bounded images, wherein an additional combined image unmerger is located between the video decoder and original image unmerger, and wherein the combined image unmerger receives bounding box metadata and unmerges the collage of bounded images into separate bounding boxes with the use of the received bounding box metadata.

In another aspect of the current disclosure, a method for transmitting color and depth information is disclosed, comprising capturing a full color image frame of a scene; capturing a grayscale depth image frame of the scene; identifying a target in the scene; generating a bounding box encapsulating the target, the bounding box having a depth dimension; creating bound grayscale depth images and bound full color images; converting the bound grayscale depth images into a bound full color depth image by linking and normalizing the depth dimension of the bounding box to a transferred color gamut; implementing a transfer function; merging bound full color images and bound full color depth image together into bound merged full color images, the bound merged full color images containing information that is focused on the target; and encoding the bound merged full color images into an image bitstring. In some embodiments, a computing device applies the bounding box to the grayscale depth image to create a bound grayscale depth image and to the color image frame to create a bound color image.

In further embodiments, the method further comprises generating the color gamut; and generating the transfer function that is used to generate, from the bound grayscale depth image, the bound color depth image. In some embodiments, the generating of the transfer function uses target key points of the target. In some embodiments, a color gamut generator is provided to generate the color gamut; and a transfer function generator is provided to generate the transfer function that is used by a depth colorizer to generate from the bound grayscale depth image the bound full color depth image.

In further embodiments, the method further comprises generating a plurality of bounding boxes and creating a collage of images composed of merged bounding boxes. In some embodiments, an additional combined image merger is located between the merging and the encoding steps so that, in response to more than one bounding box being used, the combined image merger creates a collage of images composed of merged bounding boxes. In further embodiments, the transfer function generator considers target keypoints of the target when generating the transfer function.

In further embodiments, the method further comprises adapting the bounding box dynamically according to the size, shape and orientation of the target; adapting the transferred color gamut by altering its length to stay normalized along the depth dimension; and adjusting the transfer function to provide for the change in depth dimension so that the depth dimension of the target is substantially covered by the transfer function and transferred color gamut. In yet further embodiments, the method comprises adjusting the transfer function by varying the gradient of the function.

In another aspect of the current disclosure, a method for receiving color and depth information is provided, comprising: receiving an image bitstring; decoding the image bitstring into a bound merged full color image; unmerging the bound merged full color image into a bound full color image and a bound full color depth image; decolorizing the bound full color depth image into a bound grayscale depth image by using a transfer function and a color gamut; and reconstructing the target by using the bound full color image and the depth of the bound grayscale depth image.

In a further embodiment, the method for receiving color and depth information further comprises receiving transfer function metadata, a color gamut and bounding box metadata; using the received transfer function metadata, color gamut and bounding box metadata to convert the bound color depth images into bound grayscale depth images; and reconstructing the target using the bound color image and the bound grayscale depth image and the received bounding box metadata.

In some embodiments, a depth decolorizer is provided, which is capable of receiving a transfer function metadata, a color gamut and bounding box metadata; a depth decolorizer uses the received transfer function metadata, color gamut and bounding box metadata to turn the bound full color depth images into bound grayscale depth images. In some embodiments, a target reconstructor is provided, which is capable of receiving bounding box metadata; and reconstructing the target by using the bound full color image and the bound grayscale depth image as well as the received bounding box metadata.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below, and particularly pointed out in the claims filed with the application. Such combinations have advantages not specifically recited in the above summary. Other features and advantages of the present invention will be apparent from the accompanying drawings and from the detailed description that follows below.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

General System Overview

Figure 1:
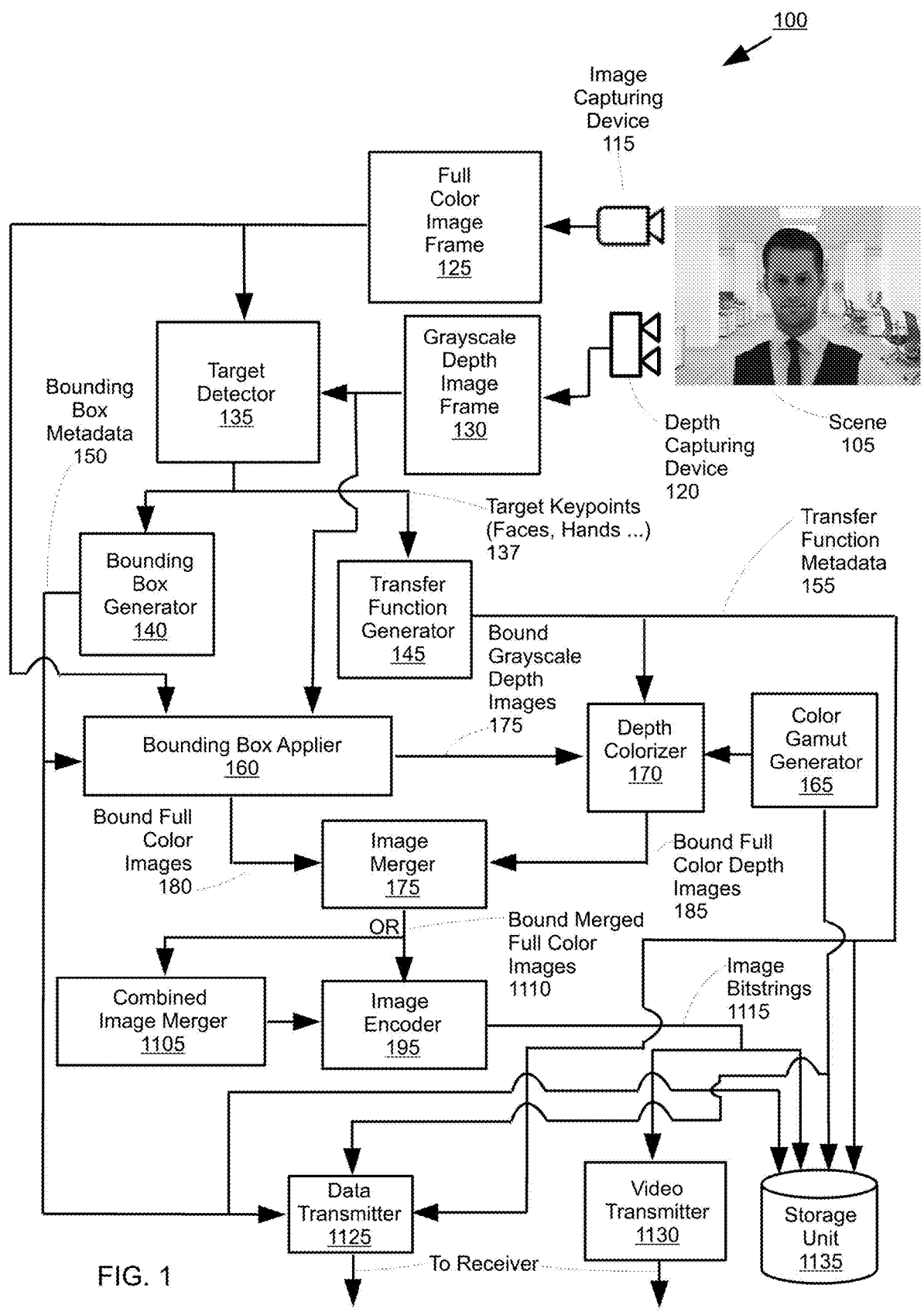
FIG. 1 is a block diagram that shows a system for transmitting color and depth information.

Shown in FIG. 1 is an illustrative system 100 for transmitting color and depth information. As can be seen in FIG. 1, an image capturing device 115 is provided for capturing color information as a color image frame 125 of a scene 105. The color image frame 125 can, for example, be in a red, green, and blue (RGB) image format with color channels having 24 bits per pixel (24b/px), or in some other format. In some embodiments, the image capturing device 115 can also be a color camera with a YUV output.

In the example shown in FIG. 1, the scene 105 is the upper part of a person in an office environment. A depth capturing device 120 captures depth information as a grayscale depth image 130 of the scene 105. The grayscale depth image 130 can be, for example, a depth image frame grayscale at 16 bits per pixel (16b/px). This means the depth camera outputs depth with 16-bit precision, which can have up to 65,535 values per pixel. Alternatively, other format or bit precisions can be used. It should be understood that this disclosure is not limited to any particular image format or number of bits per channel.

In the example shown in FIG. 1, image frames 125 and 130 are sent to a target detector 135. In this example, the target detector 135 detects how many targets there are in the scene 105.

The target detector 135 also detects target key points like faces and hands 137 of the targets. The target detector 135 comprises computer vision algorithms that can be implemented in various ways, including with artificial intelligence (AI) algorithms. The target detector 135 is connected to a bounding box generator 140 and transfer function generator 145.

In the example shown in FIG. 1, the key points 137 are used to do two things. Firstly, the key points 137 are used to generate the bounding boxes with the bounding box generator 140. A bounding box may be generated for each target in the image. The bounding box is a bounding volume that encapsulates the target and its key points 137, which can help in the reduction of the area of interest so that other areas are left out, concentrating and focusing any subsequent processing only in the areas within the bounding box. Secondly, a transfer function is generated with the transfer function generator 145. The transfer function is generated by taking into account the position of the key points of the target, for example, the faces and hands of the target. Thus, a transfer function will be generated that accentuates as much as possible the detail of the target key points like faces and hands 137.

It should be understood that the target is not always a face and body with hands. The target can be anything, such as a plant or animal, and the key points 137 can be adapted for identifying such targets (e.g., leaves for a plant).

The bounding box generator 140 generates bounding boxes that can then be applied for each of the targets.

In the example shown in FIG. 1, the bounding box generator 140 sends bounding box metadata 150 to a bounding box applier 160. The bounding box metadata 150 describes and defines the bounding box. The bounding box metadata 150 contains the position of the bounding box vertices or any other information necessary to represent a bounding box. For example, a bounding box can be described by using a single vertex and using the length of two of its edges, fixing its rotation to always be aligned to the field of view of the camera. The full color image frame 125 is connected to the bounding box applier 160, and the grayscale depth image frame 130 is also connected to the bounding box applier 160.

Once the bounding box is created by the bounding box generator 140, the bounding box generator 140 sends the information representing the bounding box to the bounding box applier 160. The full color image frame 125 and the grayscale depth image frame 130 are taken and a bounding box is applied to the target in scene 105. The bounding box encapsulates the target.

When a user wants to start transmitting a scene, the user may select the number of separate individual targets to track (for example, people). If the user chooses to only have a single target in the transmission, a bounding box will be generated for the selected target in the scene and other potential targets will be ignored.

In case a non-selected target not having an allotted bounding box enters the bounding box of the chosen target, the user can choose between three options:

Option 1.

Figure 3:
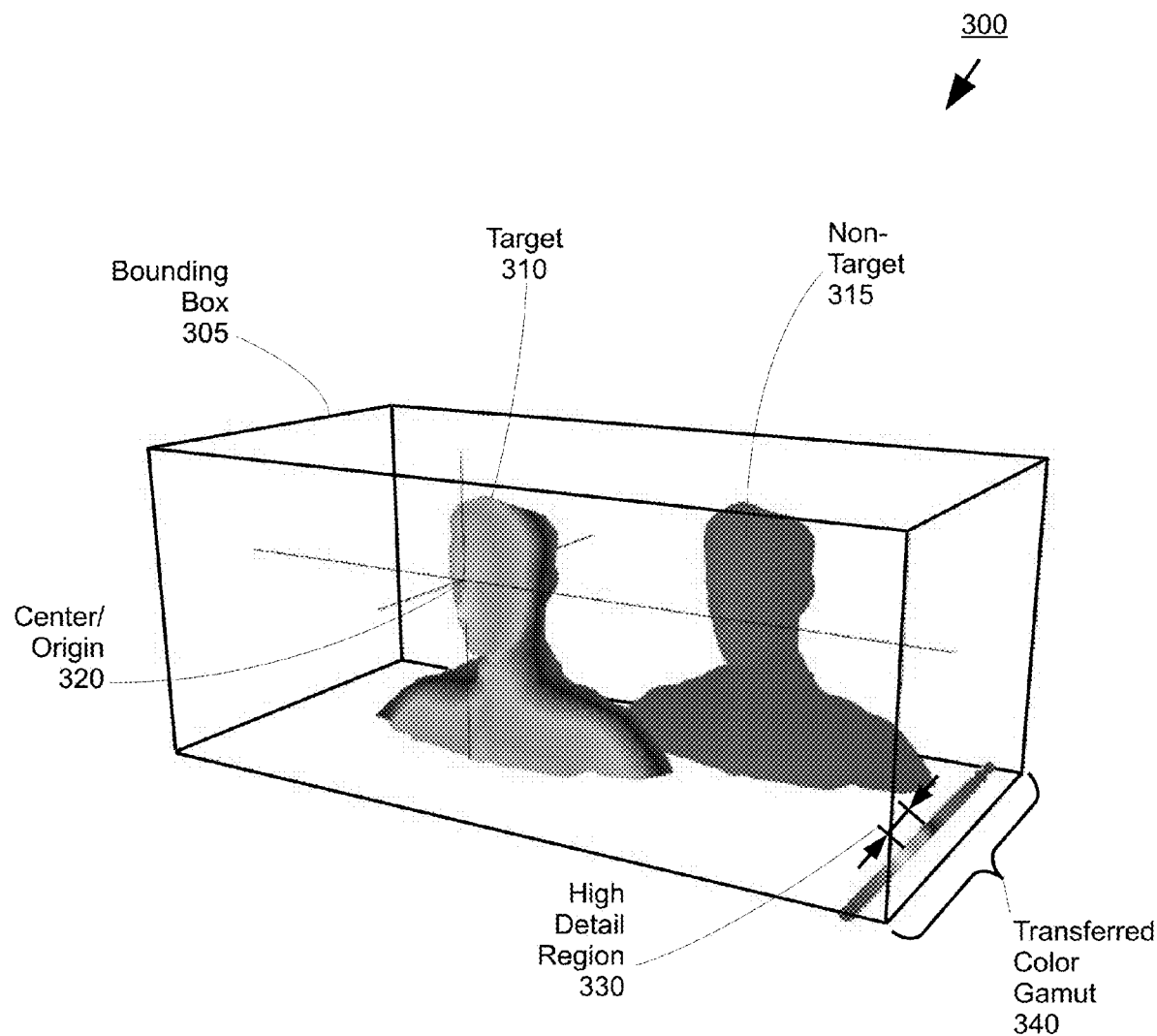
FIG. 3 is a diagram of a bounding box arrangement that shows two targets within a bounding box wherein a transfer function completely disregards a non-selected target.

The non-selected target will appear in the transmission, as shown in FIG. 3, which is described in further detail below. In this situation, the user can choose that the transfer function completely disregards the non-selected target, maintaining the entirety of the detail for the selected target and focusing only on the selected target.

Option 2.

Figure 4:
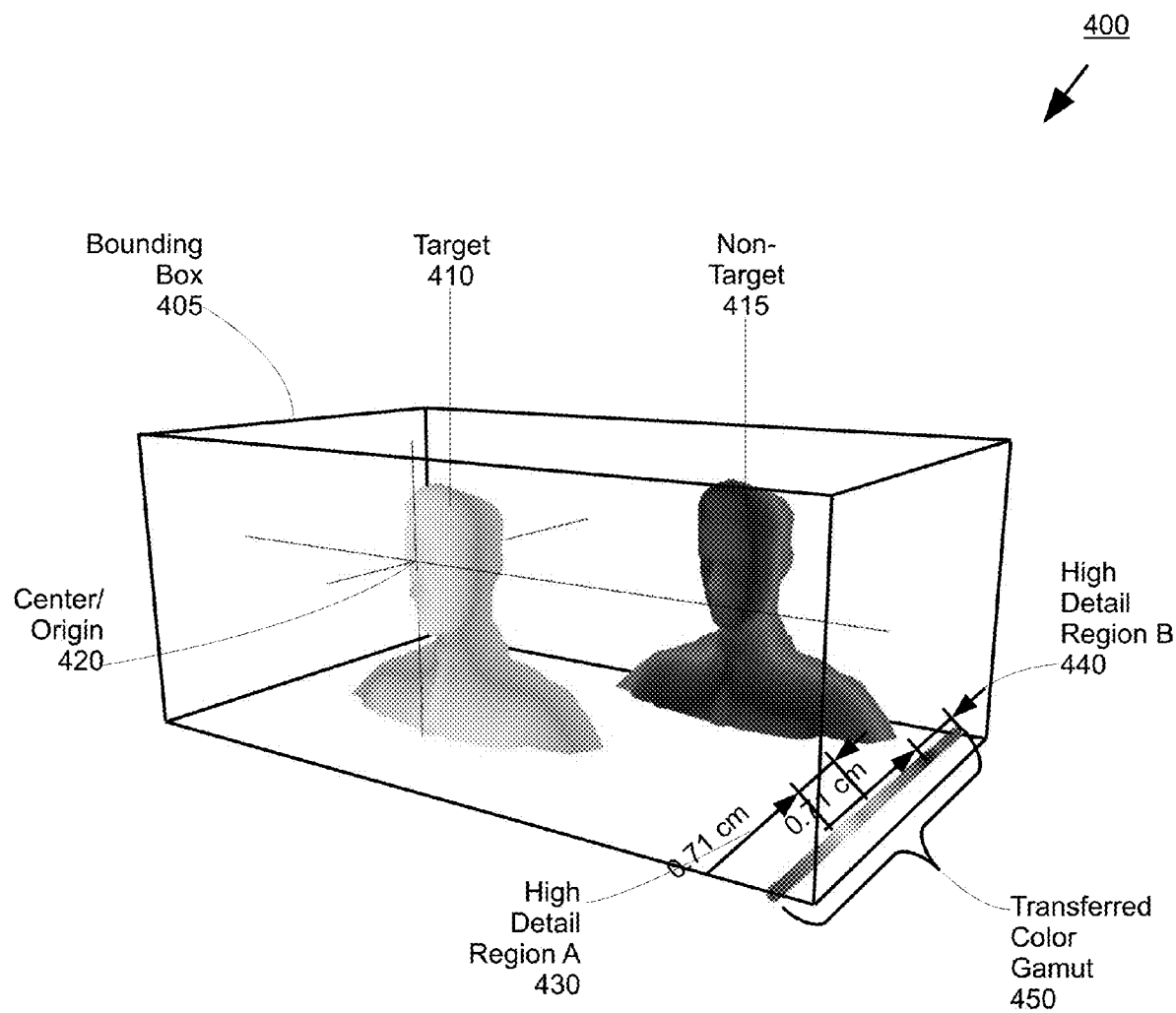
FIG. 4 is a diagram of a bounding box arrangement that shows two targets within a bounding box including a non-selected target that is described and defined by the transfer function.

The non-selected target will appear in the transmission, and the user can choose that the non-selected target be included and also be described and defined by the transfer function while also focusing on the non-selected target, as shown in FIG. 4, which is described in further detail below.

Option 3.

The user can choose that the non-selected target be completely removed, as it is considered part of non-relevant background.

If the user selects to track two different targets, a corresponding bounding box will be created for each of the selected targets. In some embodiments, the bounding boxes for the different targets remain independent, and they will not fuse with proximity.

In some embodiments, if a third non-selected target were to enter one of the two bounding boxes, it will be treated with one of the three behaviors described above.

Referring again to the example shown in FIG. 1, the bounding box applier 160 creates a cropped, bound full color image 180 and a cropped, bound grayscale depth image 175. In some embodiments, the mentioned cropping is enabled through the removal of any areas outside of the bounding box, displaying only the areas of interest within the bounding box created by the bounding box applier 160.

At this point the cropped, bound grayscale depth image 175 is still in grayscale, which is not suitable for sending it by real-time communication in some scenarios, such as web-based communication services that do not support grayscale, only full color video. In such situations, the cropped, bound grayscale depth image 175 can be colorized. In the example shown in FIG. 1, this is accomplished with the depth colorizer 170. The color gamut generator 165 is connected to depth colorizer 170. The color gamut generator 165 generates an original color gamut and sends it to the depth colorizer 170.

The transfer function generator 145 is connected to the depth colorizer 170 and sends transfer function metadata 155 to the depth colorizer 170. The transfer function metadata 155 describes and defines the transfer function to be used to colorize each of the bounding boxes. This function may be represented as a Look Up Table (LUT), an equation, or some other approximation. For example, given five different bounding boxes, each containing a different target, there shall be five different transfer functions, each mapped in a one-to-one relation to each of the bounding boxes. These transfer functions try to maximize the detail of regions of interest within the bounding box, such as the hands or face.

In some embodiments, a non-linear transfer function is used. As one potential advantage of this approach, a non-linear transfer function results in more detailed key points. Most image and video compression algorithms compress slight changes in a tone of color to stepped gradations, effectively making the depth map coarse or blocky and not as smooth as needed for more accurate 3D reconstructions. Furthermore, many compression algorithms compress dark areas more than bright ones. Therefore, the generated color gamut will maximize the brightness of the colors used, limiting the number of colors that can be used. Thus, to make the most out of the limited number of colors, the transfer function maximizes the usage of the available tones of colors in key points (reducing compression ratio), and minimizes it for low interest areas (increasing compression ratio). The transfer function can be chosen so that it tries to make the most out of the available colors in the color gamut by focusing on the target.

With the use of the color gamut and transfer function metadata 155 and a color gamut generated by the color gamut generator 165, the depth colorizer 170 transforms the bound grayscale depth images 175 to bound full color depth images 185.

The depth colorizer 170 is connected to an image merger 175. The depth colorizer 170 sends the bound full color depth images 185 to the image merger 175. The bounding box applier 160 is connected to an image merger 175 and sends bound full color images 180 to the image merger 175. The image merger 175 merges the bound full color depth images 185 and the bound full color images 180 into bound merged full color images 1110.

There will be a merged image for each bounding box that has been created. The metadata used in the creation of the bounding box and the transfer function are sent to a transmitter to send it to a receiver. This metadata used during the encoding will be used in the decoding.

Subsequently, two options are provided, either to create a separate channel, one for each bounding box created, or to send a single image containing all the bounding boxes created through the same communications channel. If using a single image containing all the bounding boxes created through the same communications channel, then a combination or collage of images is created. Such a combination or collage of images may require saving the indexing of the targets and sending it to the transmitter. This indexation is given by the bounding box and transfer function metadata.

The bound merged full color images 1110 are sent to the image encoder 195. The image encoder 195 encodes and compresses bound merged full color images 1110 into image bitstrings 1115 that are sent to video transmitter 1130 and/or storage unit 1135. Video transmitter 1130 transmits image bitstrings 1115 to a receiver. The storage unit 1135 stores the image bitstrings 1115, which can be retrieved by the receiver and viewed later.

An alternative from image merger 175, indicated by "OR", is that the bound merged full color images 1110 are sent to combined image merger 1105. Combined image merger 1105 is used when there is more than one bounding box and when sending a single image containing all the bounding boxes created through the same communications channel. A combined image or collage of images has to be created. Combined image merger 1105 is used to create the combined image or collage of images. Combined image merger 1105 is also connected to image encoder 195.

Bounding box generator 140 is also connected to data transmitter 1125 and sends bounding box metadata 150 to data transmitter 1125. Transfer function generator 145 is also connected to data transmitter 1125 and sends transfer function metadata 155 to data transmitter 1125. Color gamut generator 165 is also connected to data transmitter 1125. The color gamut generator 165 sends the original color gamut to transmitter 1125.

Data transmitter 1125 transmits to a receiver the received bounding box metadata 150, transfer function metadata 155, and the original color gamut that was generated by color gamut generator 165.

Also connected to storage unit 1135 is bounding box generator 140 that sends the bounding box metadata 150 to storage unit 1135. Color gamut generator 165 is also connected to storage unit 1135 which also sends the original color gamut to the storage unit 1135. Finally, the transfer function generator 145 is connected to the storage unit 1135 which sends the transfer function metadata 155 to the storage unit 1135.

Various alternatives of the system 100 are possible. In some embodiments, the system 100 is implemented as an integrated system with computer circuitry for carrying out described calculations and functionality as well as one or more integrated color image capturing devices 115 and one or more depth capturing devices 120. Such a system may be configured to, e.g., capture color and depth images of a user, transform them into meshes, and send those meshes to a receiving device that reconstructs them and places them in the virtual environment. In such an embodiment, all the modules and functions of the system 100 are performed by the same integrated device. Alternatively, the system 100 is implemented as multiple devices (e.g., as one or more computing devices in communication with attached or wirelessly coupled cameras).

Figure 2:
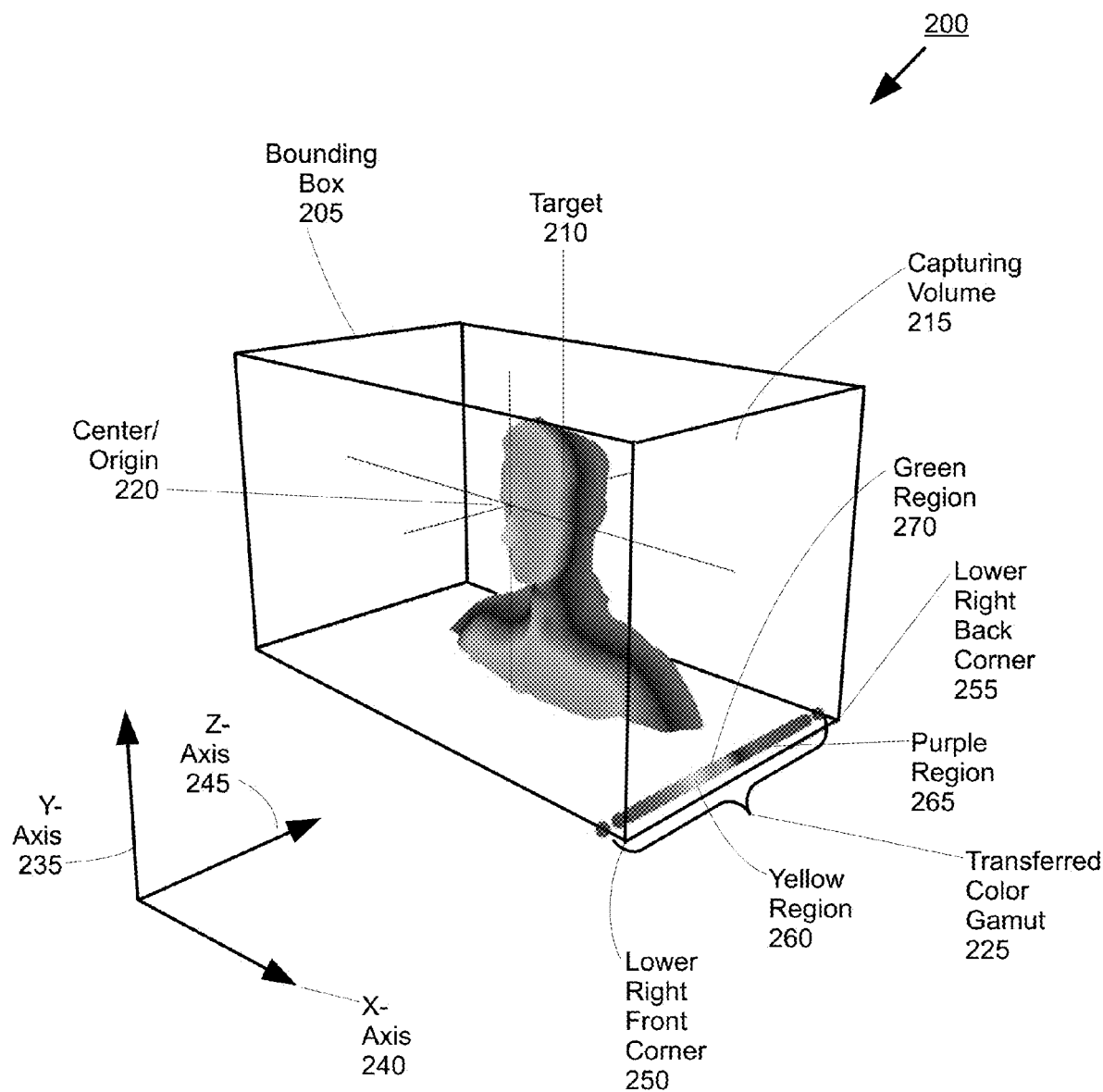
FIG. 2 is a diagram of a bounding box arrangement that shows a target within a bounding box.

FIG. 2 is a diagram of a bounding box arrangement 200 that shows a target within a bounding box. In the example shown in FIG. 2, bounding box 205 is generated by bounding box generator 140 in FIG. 1. The bounding box 205 encapsulates a target 210 and its immediate surroundings defining capturing volume 215. In this case the target 210 is the person in the scene 105 in FIG. 1. The target 210 is only the upper torso and face of the person. The rest of the office environment is of no interest and is disregarded. Bounding box 205 has a center/origin 220. This center/origin 220 is the center of the target 210 and the origin of the bounding box 205. In some embodiments, the center of the bounding box 205 may not be the center of the target 210. In such embodiments, the center of the bounding box 205 will be shifted as is deemed necessary to maximize the coverage and detail of the key points within it. The rows in which the pixels of the target appear are arranged along the Y-axis 235. The columns in which the pixels of the target appear are arranged along the X-axis 240. The depth dimension or range at which the pixels of the target are located is arranged along the Z-axis 245. The Z-axis of bounding box 205 is linked to a transferred color gamut 225. In this example, transferred color gamut 225 is the original color gamut which was generated by color gamut generator 165 in FIG. 1 and transferred by the transfer function generated by transfer function generator 145.

The transferred color gamut 225 is normalized so that it falls on the Z-axis and depth dimension of the bounding box 205 and covers the full depth range of the bounding box 205. In other words, the full scope of the colors of the transferred color gamut 225 falls between the lower right front corner 250 and lower right back corner 255 of bounding box 205. It should be understood that this disclosure is not limited to the transferred color gamut 225 as shown in FIG. 2. Other color gamuts also may be used.

As can be seen in FIG. 2 moving along the Z-axis or depth dimension of the bounding box 205, starting from the lower right front corner 250 of the bounding box 205 and moving towards the lower right back corner 255, the first part that we encounter of target 210 is the target's nose, which is yellow in this example. This corresponds to the yellow region 260 of the transferred color gamut 225. The color of the pixels of the nose of the target 210 and the color of the transferred color gamut 225 are the same depending on what position they are within the depth range what they are within the bounding box 205. Moving further along the Z-axis or depth dimension of the bounding box 205 towards the lower right back corner 225, the green frontal part of the torso and the green frontal part of the face of the target 210 are encountered. This is approximately the center/origin 220 which is the center of the target 210 and the origin of the bounding box 205. This corresponds to the green region 270 of the transferred color gamut 225. The same can be said where the target 210 is light blue, dark blue and purple and the transferred color gamut 225 is correspondingly light blue, dark blue and purple. Lastly, the back part of the target 210, which is positioned towards the back of the head and includes the ear as well as neck and shoulders, is purple. It corresponds with the purple region 265 of transferred color gamut 225. The color of the pixels of the target 210 and the color of the transferred color gamut 225 is the same depending on the point along the depth dimension along the Z-Axis that they are within the bounding box 205.

As mentioned, the transferred color gamut 225 shown in FIG. 2 has already been shifted or transferred by the transfer function, and not the original color gamut created by the color gamut generator 165 in FIG. 1. Note how the red area is much longer than the yellow, green, blue and purple areas. This is not the case for the original generated color gamut to which the transfer function has not yet been applied or transferred by the transfer function.

FIG. 3 is a diagram of a bounding box arrangement 300 that shows two targets within a bounding box where the transfer function disregards the non-selected target. Bounding box 305 has a selected target 310 towards the front left and non-selected target, or non-target 315, towards the right back. This illustrates the embodiment stated in the description of FIG. 1 with regard to option 1. The non-target 315 will appear in the transmission as is shown in FIG. 3 and the user, or the system itself, can choose that the transfer function completely disregards the non-selected target 315, maintaining the entirety of the detail for the selected target (target 310) and focusing only on the selected target (target 310).

The center/origin 320 is the center of first target 310 and the origin of the bounding box 305. As can be seen in FIG. 3, target 310 has associated with it high detail region 330 on transferred color gamut 340. Target 310 and the high detail region 330 vary in color from yellow to dark blue. The non-target 315 is not associated with the high detail region 330 on color gamut 340.

The transferred color gamut 340 shown in FIG. 3 has already been shifted by the transfer function, and is therefore not the original color gamut created by the color gamut generator 165 in FIG. 1. Note how the red area is much longer than the high detail region 330 comprising the yellow, green, blue and purple areas. This is not the case for the original generated color gamut to which the transfer function has not yet been applied. The high detail region 330 is more compact and focused on target 310. Compare that with non-target 315 where the color varies only from purple to red. Here the color gamut 340 is more stretched out and less focused.

FIG. 4 is a diagram of a bounding box arrangement 400 that shows two targets within a bounding box including the non-selected target which is also described and defined by the transfer function. Bounding box 405 has a selected target 410 towards the front left and non-selected target, or non-target 415, towards the right back. This illustrates the embodiment stated in the description of FIG. 1 with regard to option 2. The non-target 415 will appear in the transmission, and the user can choose that the non-target 415 be included and also be described and defined by the transfer function as shown in FIG. 4.

The center/origin 420 is the center of first target 410 and the origin of the bounding box 405. As can be seen in FIG. 4, target 410 has associated with it high detail region A 430 on transferred color gamut 450. Target 410 and the high detail region A 430 vary in color from yellow to blue. The non-target 415 has associated with it a high detail region B 440 on transferred color gamut 450.

The transferred color gamut 450 shown in FIG. 4 has already been shifted by the transfer function, and is not the original color gamut created by the color gamut generator 165 in FIG. 1. Note how the red section or area of the transferred color gamut 450 before the high detail region A 430 area is much longer than the high detail region A 430 comprising the yellow, green, light blue sections or areas. Then follows an area of little change from light blue to dark blue of the color gamut 450. This is the case for the original generated color gamut to which the transfer function has not yet been applied. The high detail region A 430 is more compact and focused on target 410. Compare that with where the color varies only from light blue to dark blue. Here the transferred color gamut 450 is more stretched out and less focused. We then approach a high detail region, the region B 440. This corresponds with non-target 415. Here there is once again a rapid change from dark blue, purple and red, and the color gamut 450 is more compact and focused.

Figure 5:
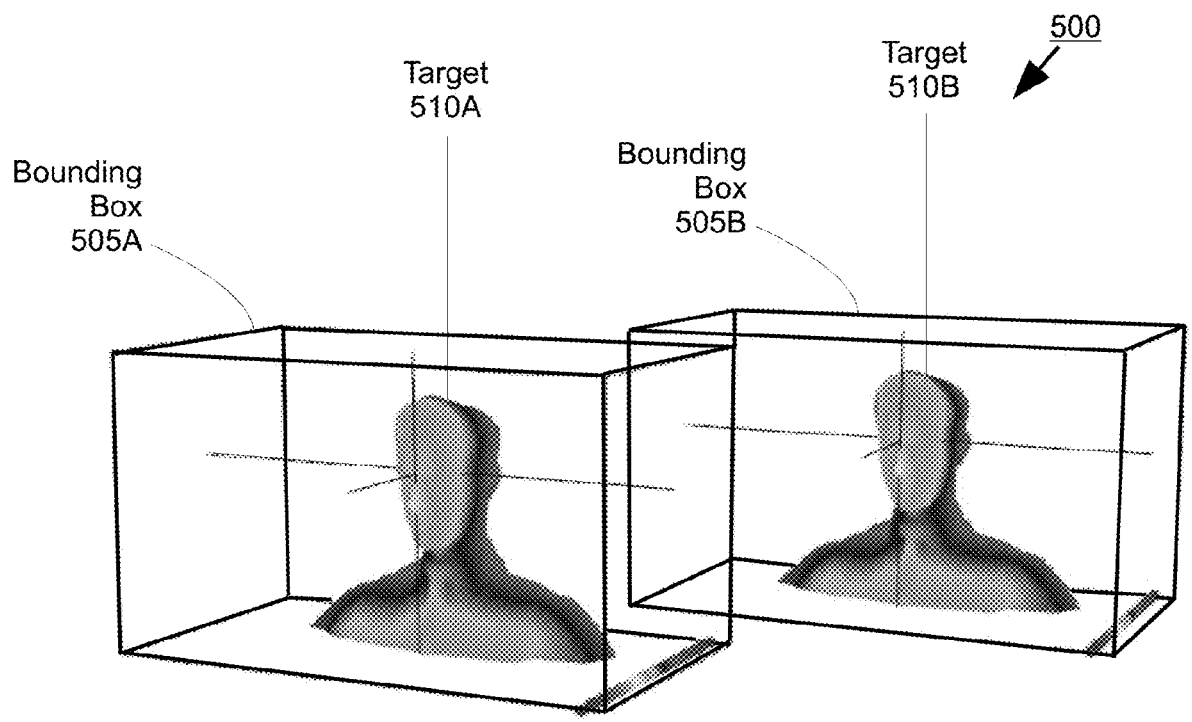
FIG. 5 is a diagram of a bounding box arrangement that shows two targets, each within a bounding box.

FIG. 5 is a diagram of a bounding box arrangement 500 that shows two targets 510A, 510B, each within a bounding box 505A, 505B, illustrating an embodiment where the targets are sufficiently spaced apart to such an extent that each target acquires its own bounding box. In some embodiments, the main factor deciding to give each target an individual bounding box is the number of targets selected by the user, not the distance between them. In this case there are 2 people, and the user selected to track 2 targets (at minimum). If both targets were to get close enough for the bounding boxes to touch or overlap, they will not, in this example, fuse into a single one.

Figure 6:
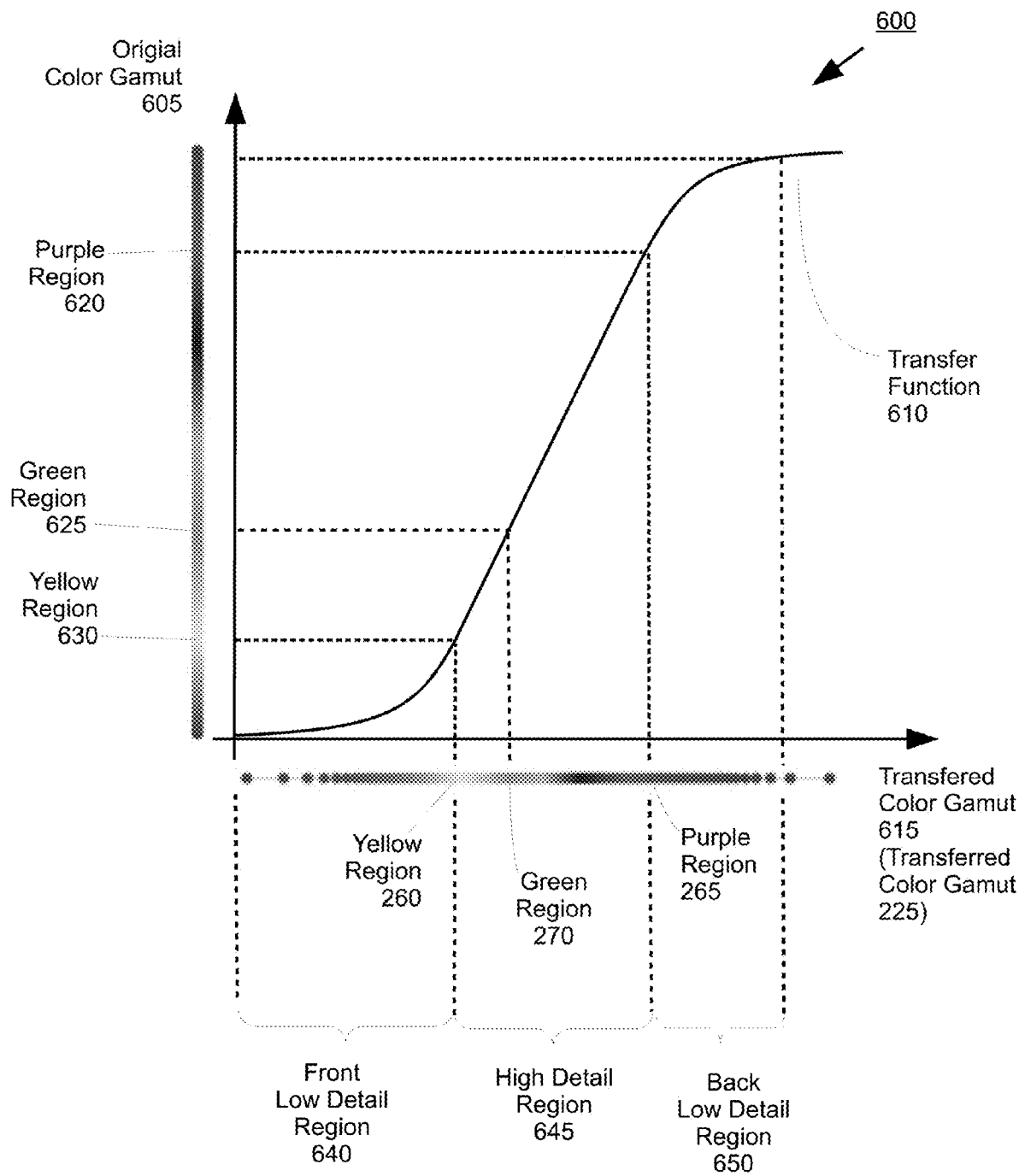
FIG. 6 is a graph of a transfer function.

FIG. 6 is a graph 600 of a transfer function 610 which in some embodiments is generated by transfer function generator 145 in FIG. 1. On the Y-axis in FIG. 6 is the original color gamut 605. On the X-axis in FIG. 6 is the transferred color gamut 615. Transferred color gamut 615 is the original color gamut 605 transferred by transfer function 610. Transferred color gamut 615 is the same as transferred color gamut 225 which is shown on the depth dimension or range shown on the Z-axis 245 in FIG. 2. Transfer function 610 transfers yellow region 630 on the Y-axis to yellow region 260 on the X-axis. In a similar fashion it transfers green region 625 and purple region 620 on the Y-axis to green region 270 and purple region 265 on the x-axis. Yellow region 260, green region 270 and purple region 265 are also shown on the depth dimension or range shown on the Z-axis 245 in FIG. 2.

In this particular instance as shown in FIG. 6 the transfer function 610 is generally in the shape of a sigmoid function. It should however be understood that this disclosure is not limited to any particular function shape and other transfer functions may be used. For example, the transfer function can be a continuous bijective or invertible function.

Referring back to FIG. 1 the transfer function generator 145 is connected to the depth colorizer 170 and sends transfer function metadata 155 to the depth colorizer 170. The transfer function metadata 155 contains the transfer function. This transfer function that the transfer function generator 145 generated is the transfer function 610 shown in FIG. 6.

The color gamut generator 165 generates the color gamut and sends it to the depth colorizer 170. This color gamut that the color gamut generator 165 generated is the original color gamut 605 shown on the Y-axis in FIG. 6.

The depth colorizer 170 transforms the bound grayscale depth images 175 to bound depth images 185 with the use of the transfer function 610 and original color gamut 605 shown in FIG. 6.

As can be inferred from in FIG. 6 by altering the angle or gradient of the transfer function, the color range over which the target is described can be altered. Thus, for example, by decreasing the angle of the transfer function the target can for example be described over the range of colors that spans from orange to purple.

Referring back to FIG. 2, it should be understood that in some embodiments, the bounding box 205 adapts dynamically according to the size, shape and orientation of the target 210. For example, if the target 210 turns 90 degrees to the right and his left shoulder is in front and his right shoulder is towards the back, the bounding box will remain at the same height along the Y-axis 235 but it will adapt by decreasing its width along the X-axis 240 and it will increase in its depth dimension along the Z-axis 245. Color gamut 225 will accordingly also have to adapt by increasing in length to stay normalized along the depth dimension or Z axis 245.

In FIG. 6 the transfer function 610 also adapts by decreasing its gradient to provide for the longer depth range or depth dimension along its X-axis and increased transferred color gamut 225 along its Y-axis. In this manner the depth dimension of the target 210 is, in some embodiments, always fully covered by the transfer function 610 and color gamut 225.

As can be seen in FIG. 6 the transfer function 610 is divided into 3 sections. They are the front low detail region 640, the high detail region 645 and the back low detail region 650. It should be understood that other regions or other numbers of regions of varying interests also may be used. The mentioned regions serve only as an example.

The front low detail region 640 is now described with further reference to FIG. 2. Moving along the depth dimension on the Z-axis 245 of FIG. 2, the front low detail region 640 is the region starting from the lower right front corner 250 up to where the target 210 begins. It is the nose of the target 210 corresponding with the yellow region 260. In FIG. 6 the high detail region 645 is linked to FIG. 2. Moving along the depth dimension on the Z-axis, the high detail region 645 is the region starting from where the target 210 begins, which is the nose of target 210, until the back of the target 210 where it ends, which is a purple region 265. In FIG. 6 the back low detail region 650 is linked to in FIG. 2. Moving along the depth dimension on the Z-axis of FIG. 2, the back low detail region 650 is the region starting from the back of the target 210, which is where the purple region 265 ends until the lower right back corner 255.

Looking at FIG. 6, the area where the transfer function 605 has the steepest gradient and changes rapidly at its high detail region 645 is linked to the depth dimension where the target 210 is located in FIG. 2. The transfer function 605 can thus be selected so that the region where it changes rapidly is linked to the target itself and is focused on the target 210.

One example of a suitable transfer function 610 is a generalized logistic function, which may be appropriate for representing human beings. In some embodiments, transfer function 610 can be approximated by using various methods, such as a piecewise linear function or a pre-computed lookup table. Thus, suitable transfer functions 610 can be adapted to an appropriate depth distribution depending on the nature and shapes of the targets within the one or more bounding boxes.

Figure 7:
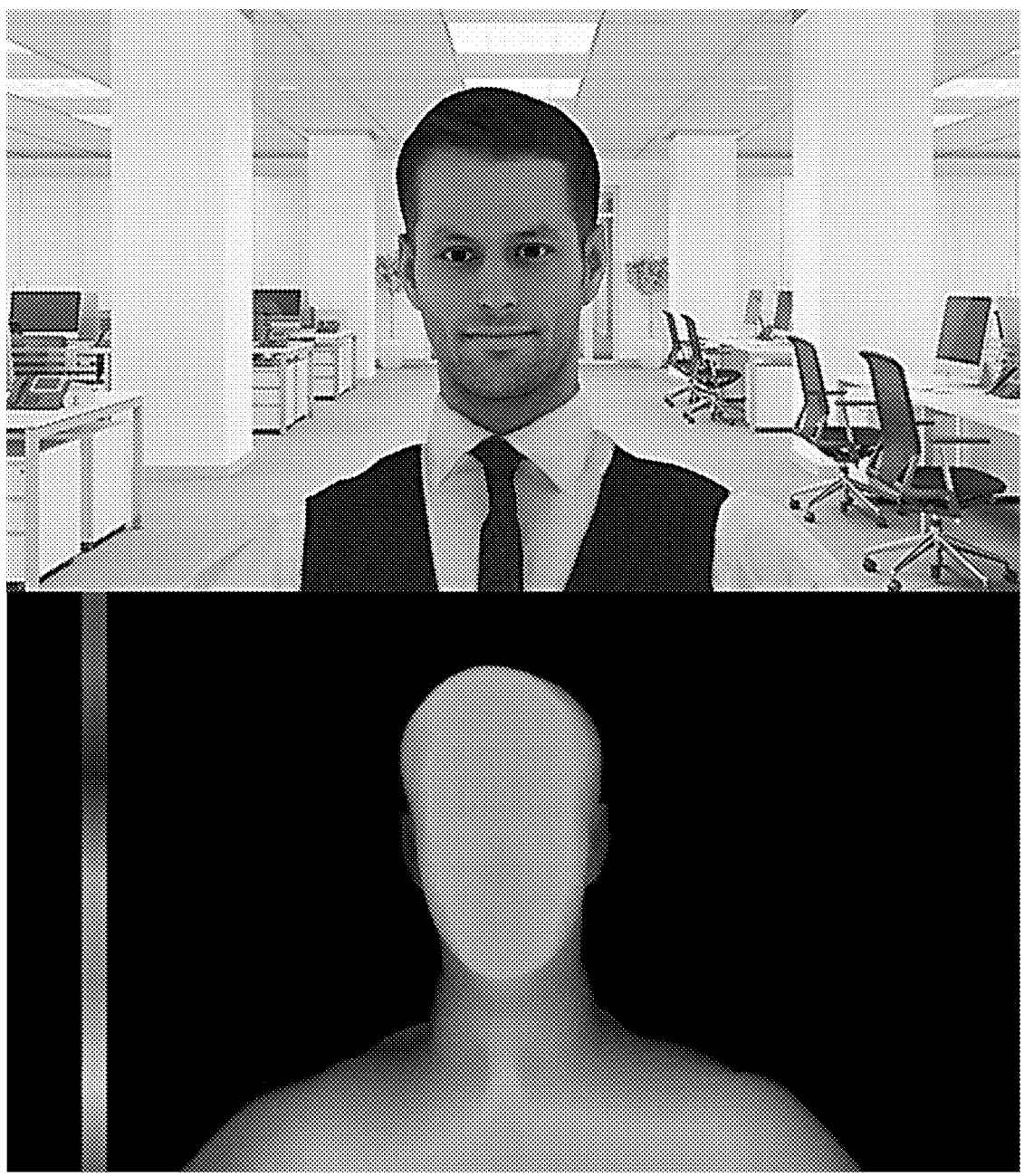
FIG. 7 is a diagram that shows a captured target wherein the color gamut has not been transferred or shifted by using a transfer function.

FIG. 7 shows how the captured target would look if the color gamut was not transferred or shifted by using a transfer function and thus not focused on a target. In this case the range of depth measuring device extends into the scene. As the color gamut is not transferred through a transfer function, the color of the target shown in FIG. 6 only varies from a yellow nose to dark blue ears at the back part of the head.

Figure 8:
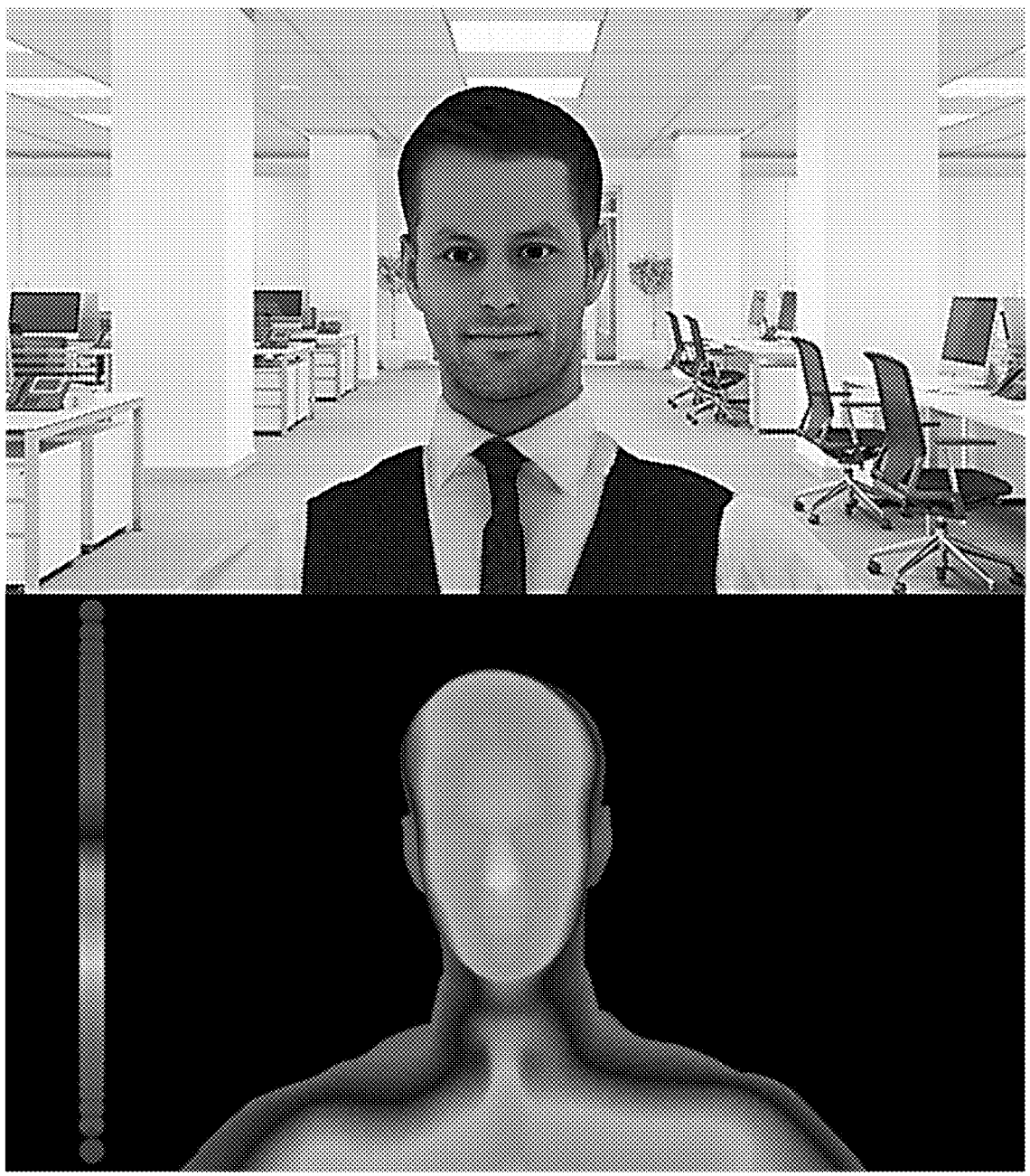
FIG. 8 is a diagram that shows a captured target wherein the color gamut has been transferred by using a transfer function, and is thus focused on the target by providing more changes in the range of color in high detail regions.

However, FIG. 8 shows an embodiment where the color gamut has been transferred so that it is focused on the target and therefore changes more quickly in the high detail regions. The color range of the target has accordingly been adjusted to be focused on the areas of interest through the transfer function. This is the case as shown in FIG. 2 where the transferred color gamut 225 is limited or normalized to the depth dimension on the Z-axis 245 of the bounding box 205 between the lower right front corner 250 and the lower right back corner 255. As the color gamut is transferred, the color of the target shown in FIG. 8 varies more extensively from a yellow nose to dark purple ears. In this case the dark blue region can be seen in front of the purple ears in FIG. 8.

This disclosure therefore provides for a larger color variation along the depth range or dimension of a target. This disclosure makes better use of the range depth information by focusing the depth measurement on the region of interest or the target.

Figure 9:
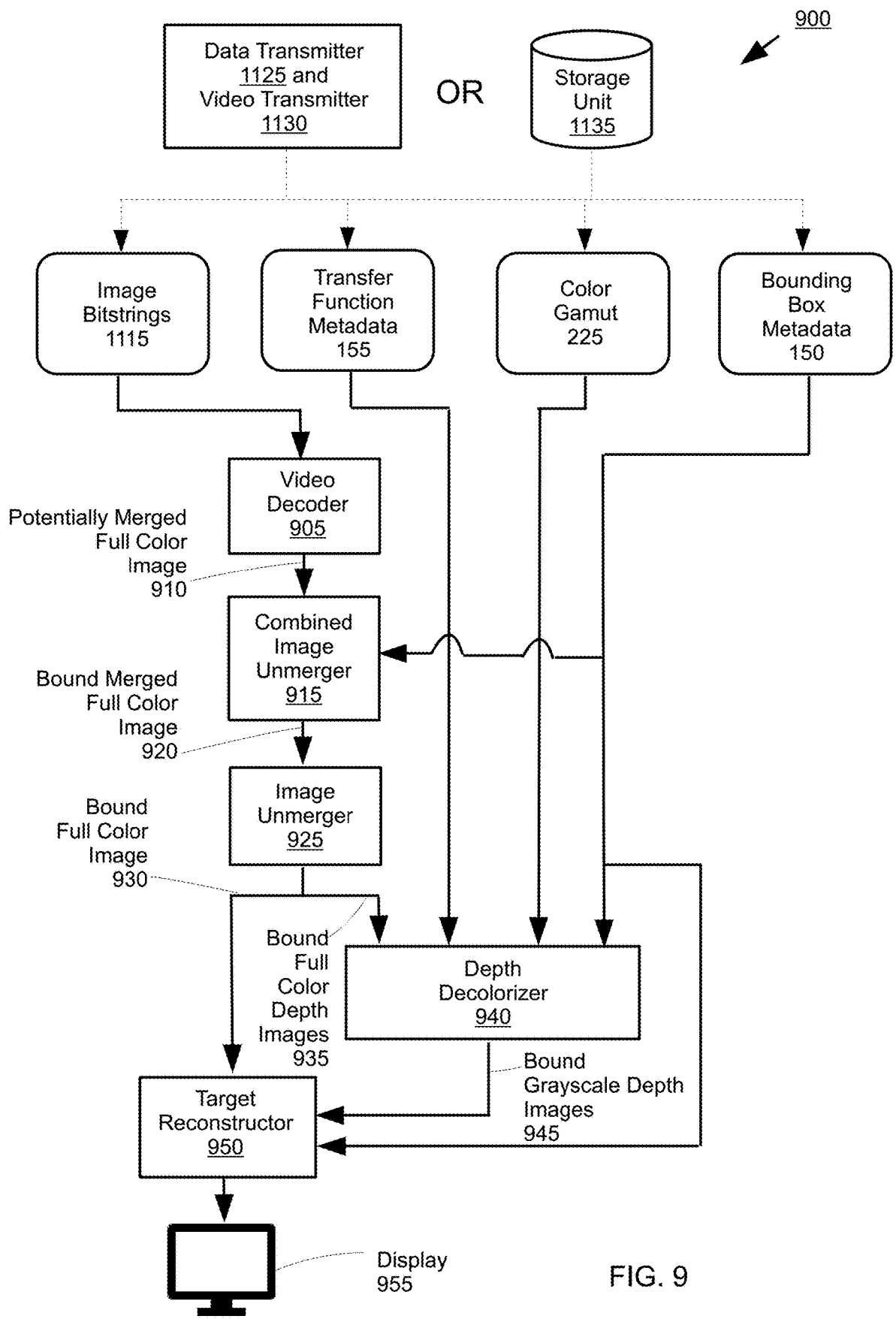
FIG. 9 is a block diagram of a system for receiving color and depth information.

FIG. 9 shows a diagram of an illustrative system 900 for receiving color and depth information. System 900 receives input from a transmitter, e.g., data transmitter 1125 and video transmitter 1130 or storage unit 1135 as illustrated in FIG. 1. The input comprises image bit strings 1115, transfer function metadata 155, color gamut 225 and bounding box metadata 150. The image bit strings 1115 are fed into the video decoder 905. In this example, a receiver can only receive data from a single channel. This means that if the transmitter chose not to use the combined image merger 1105 in FIG. 1 to combine all the separate bounded images, these separate images will need to be processed by separate receivers. Therefore, it is assumed in this example that whatever image bitstring arrived from the transmitter or storage unit, it will either be a single bounded image, or a combined image or a collage of merged bounded images.

The video decoder 905 output is a potentially merged full color image 910. This is fed into a combined image unmerger 915. Bounding box metadata 150 is also connected to combined image unmerger 915. Combined image unmerger 915 uses the bounding box metadata 150 to establish how many bounded images are contained within the merged image as in the case of a combined image or collage of images. If there is only one bounding box, then this combined image unmerger 915 operates simply as a passthrough. If there is more than one bounding box each one is unmerged by combined image unmerger 915. The bound merged full color images 920 are sent to image unmerger 925. The image unmerger 925 unmerges bound merged full color images 920 into bound full color images 930 and bound full color depth images 935. The bound full color depth image 935 is sent to a depth decolorizer 940. The depth decolorizer 940 also has as input transfer function metadata 155 color gamut 225 bounding box metadata 150. The depth decolorizer 940 turns the bound full color depth images 935 with the aid of the transfer function metadata 155, color gamut 225 and bounding box metadata 150 into bound grayscale depth images 945.

The image unmerger 925 sends the bound grayscale image 930 to the target reconstructor 950. Also connected to the target reconstructor 950 is depth decolorizer 940 which sends bound grayscale depth images 845 to the target reconstructor 950. The target reconstructor 950 also receives bounding box metadata 150. The bound full color 930 and bound grayscale depth images 945 forms a color-depth pair.

The target reconstructor 950 receives color-depth pairs (930, 945) and, using the corresponding bounding box metadata 150 for correct positioning, builds a 3D model of the target 210 in FIG. 2 that was originally captured by the image capturing device 115 and depth capturing device 120 in FIG. 1.

Where the color gamut 225 and transfer function 610 remain fixed, there is no need to package them in the image merger 175. At the receiving side the values of the transfer function 610 and color gamut 225 are provided without transmission. These values can be stored at the receiving side and sent to the depth decolorizer 940 to generate the bound grayscale depth images 945.

The resulting 3D model comprises a high level of detail given the high concentration or focus of depth data in the areas of interest through the use of the original color gamut which is transfer and adjusted by the transfer function. This is accomplished without the use of very expensive sensors or equipment.

Embodiments of the present disclosure can be used to transmit a 3D model of, for example, a person participating in a video conference in 3D environments.

Through the use of systems and method of the current disclosure, the transfer of data is done in a lightweight manner while keeping a good level of detail. The system is thus able to send in real-time the 3D model of a user (in the form of a cutout) to be inserted in a virtual environment for 3D communications.

Figure 10:
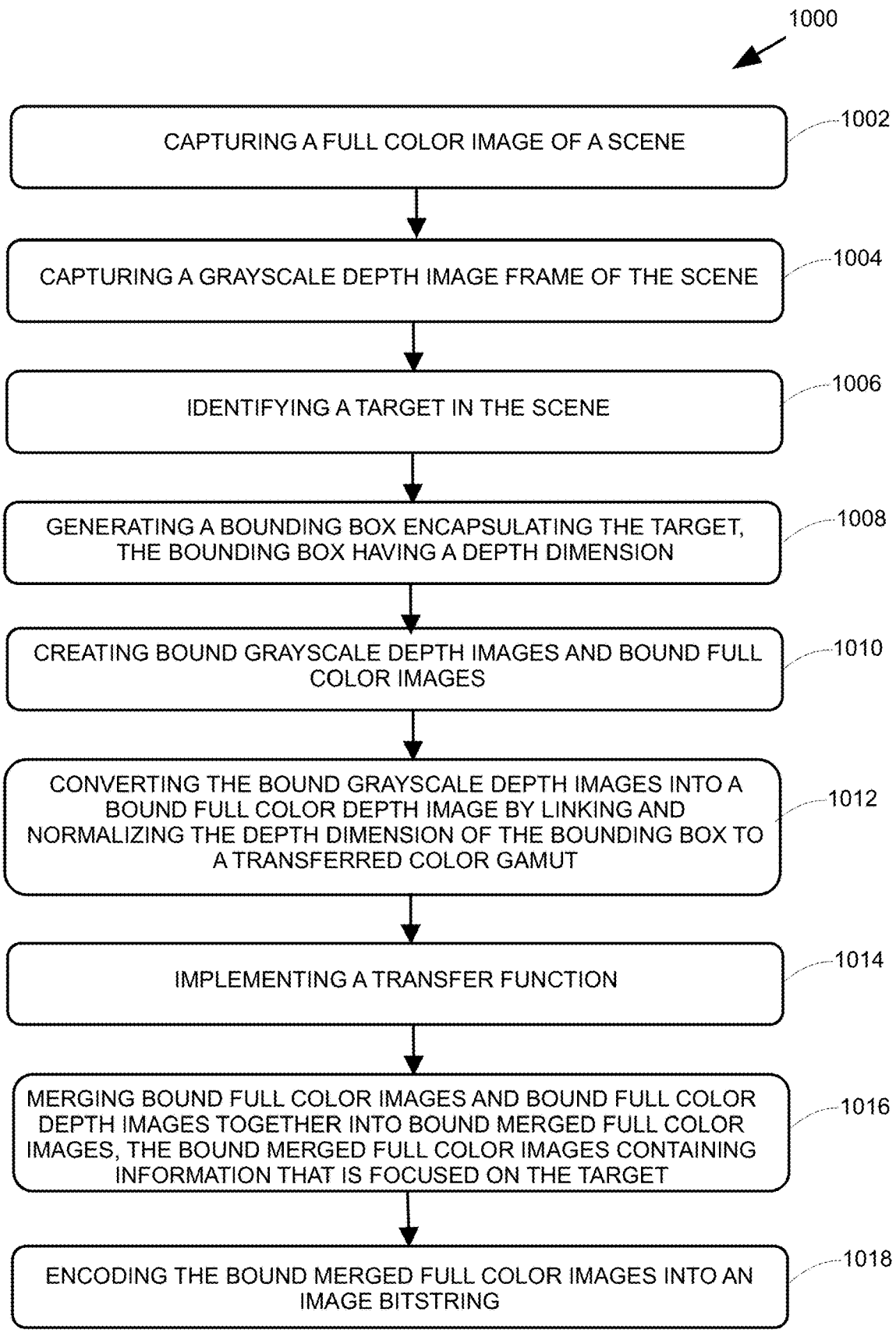
FIG. 10 is a flow chart diagram of a method for transmitting color and depth information, which may be implemented by a system such as the system of FIG. 1.

FIG. 10 shows a block diagram of a method 1000 for transmitting color and depth information, which may be implemented by a system such as system 100 of FIG. 1. The method 1000 begins in step 1002 by capturing a color image frame of a scene and continues in step 1004 by capturing a grayscale depth image frame of the scene. The method proceeds in step 1006 by identifying a target in the scene, and then in step 1008 by generating a bounding box encapsulating the target, the bounding box having a depth dimension.

In step 1010 the method 1000 proceeds by creating bound grayscale depth images and bound color images (e.g., by applying the bounding box to the grayscale depth image to create a bound grayscale depth image and to the color image frame to create a bound color image), and then in step 1012 by converting the bound grayscale depth image into a bound color depth image by linking and normalizing the depth dimension of the bounding box to a transferred color gamut. The method 1000 continues by implementing a transfer function, as viewed in step 1014, and then proceeds by merging the bound color image and the bound color depth image together into a bound merged color image, the bound merged color image containing information that is focused on the target, as viewed in step 1016. Finally, in step 1018, the method ends by encoding the bound merged color images into an image bitstring.

Figure 11:
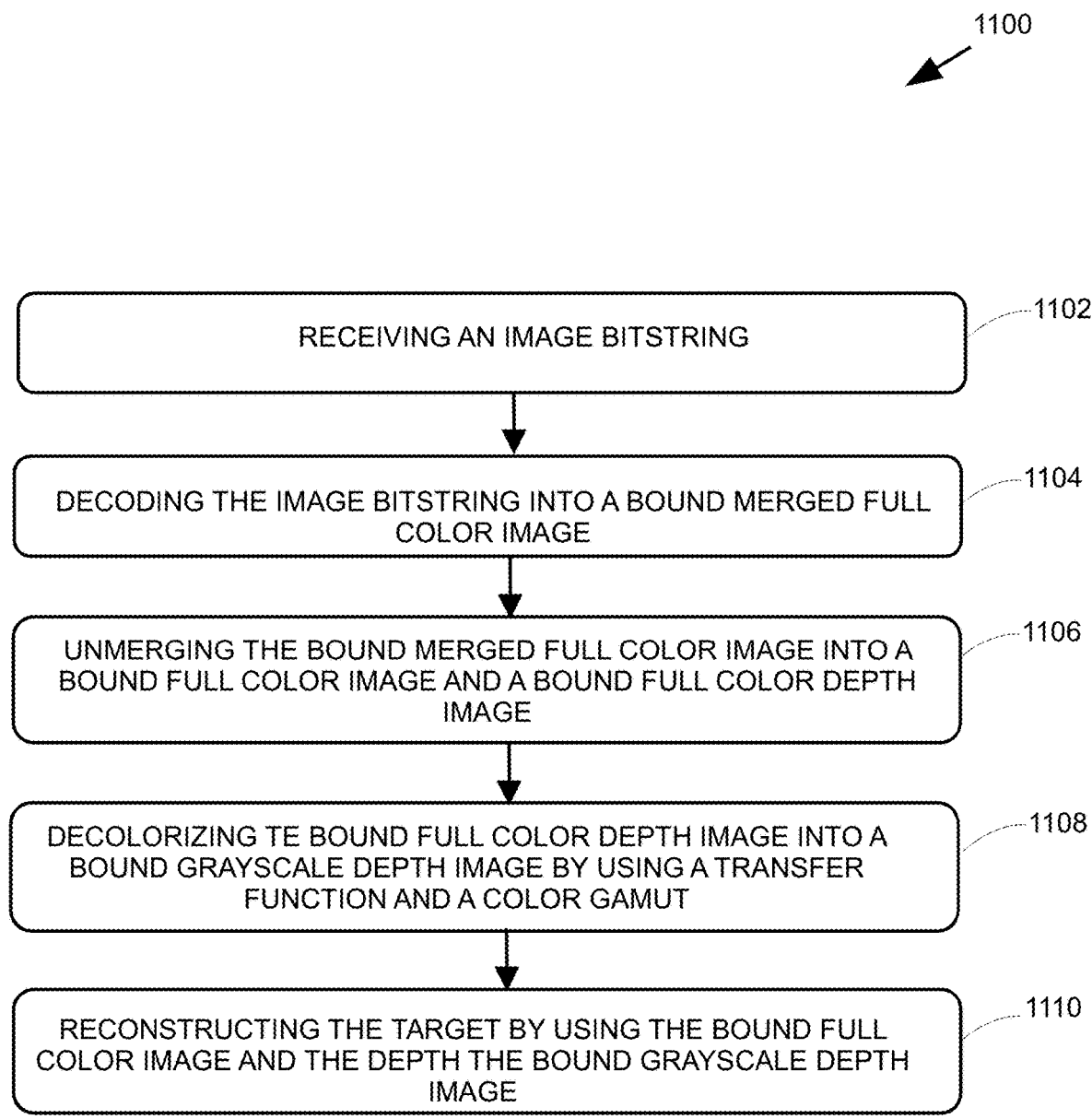
FIG. 11 is a flow chart diagram of a method for receiving color and depth information, which may be implemented by a system such as the system of FIG. 9.

FIG. 11 shows a block diagram of a method 1100 for receiving color and depth information. Method 1100 begins in step 1102 by receiving an image bitstring, and then continues in step 1104 by decoding the image bitstring into a bound merged full color image. Method 1100 continues in step 1106 by unmerging the bound merged full color image into a bound full color image and a bound full color depth image.

In step 1108, method 1100 proceeds by decolorizing the bound full color depth image into a bound grayscale depth image by using a transfer function and a color gamut. Finally, in step 1110, method 1100 ends by reconstructing the target using the bound full color image and the depth of the bound grayscale depth image.

The invention claimed is:

1. A system for transmitting color and depth information, comprising:
   a camera configured to capture a color image frame of a scene;
   a depth camera configured to capture a grayscale depth image frame of the scene;
   at least one computing device comprising a processor and memory, the at least one computing device being programmed to perform steps including:
      identifying a target in the scene with a target detector using computer vision algorithms;
      generating a bounding box encapsulating the target, the bounding box having a depth dimension;

applying the bounding box to the grayscale depth image to create a bound grayscale depth image and to the color image frame to create a bound color image;

converting the bound grayscale depth image into a bound color depth image by linking and normalizing the depth dimension of the bounding box to a transferred color gamut by implementing a transfer function, wherein the transfer function varies a compression ratio of the target within the bounding box, reducing the compression ratio in key points of the target and increasing the compression ratio for low interest areas of the target;

merging the bound color image and the bound color depth image together into a bound merged color image, the bound merged color image containing information that is focused on the target; and encoding the bound merged color image into an image bitstring.

2. A system as in claim 1, wherein the at least one computing device is further programmed to generate a plurality of bounding boxes and to create a collage of images by merging the bounding boxes.

3. A system as in claim 1, wherein the at least one computing device is further programmed to generate the color gamut and to generate the transfer function that is used to generate, from the bound grayscale depth images, the bound color depth images.

4. A system as in claim 2 wherein the at least one computing device is further programmed to use target key points of the target when generating the transfer function.

5. A system as in claim 2 wherein the bounding box adapts dynamically according to the size, shape and orientation of the target, wherein the transferred color gamut accordingly adapts by altering in length to stay normalized along the depth dimension, and wherein the transfer function is adjustable and also adjusts to provide for the change in depth dimension so that the depth dimension of the target is substantially covered by the transfer function and transferred color gamut.

6. A system as in claim 5 wherein the transfer function is adjustable by varying the gradient of the function.

7. A system as in claim 1, wherein the transfer function is a continuous bijective or invertible function.

8. A system as in claim 1 wherein the transfer function is implemented by a generalized logistic function.

9. A system as in claim 1 wherein the target is a person comprising a face and a torso or the full body of a person.

10. A system as in claim 1 wherein at least one computing device is further programmed to crop the bound grayscale depth image and the bound color images.

11. A method for transmitting color and depth information comprising:

capturing a color image frame of a scene;

capturing a grayscale depth image frame of the scene;

identifying a target in the scene with a target detector using computer vision algorithms;

generating a bounding box encapsulating the target, the bounding box having a depth dimension;

applying the bounding box to the grayscale depth image to create a bound grayscale depth image and to the color image frame to create a bound color image;

converting the bound grayscale depth image into a bound color depth image by linking and normalizing the depth dimension of the bounding box to a transferred color gamut;

implementing a transfer function, wherein the transfer function varies a compression ratio of the target within the bounding box, reducing the compression ratio in key points of the target and increasing the compression ratio for low interest areas of the target;

merging the bound color image and the bound color depth image together into a bound merged color image, the bound merged color image containing information that is focused on the target; and encoding the bound merged color image into an image bitstring.

12. A method as in claim 11 further comprising generating a plurality of bounding boxes and creating a collage of images composed of merged bounding boxes.

13. A method as in claim 11 further comprising;

generating the color gamut; and generating the transfer function that is used to generate, from the bound grayscale depth image, the bound color depth image.

14. A method as in claim 13 wherein the generating of the transfer function uses target key points of the target.

15. A method as in claim 13 further comprising:

adapting the bounding box dynamically according to the size, shape and orientation of the target;

adapting the transferred color gamut by altering its length to stay normalized along the depth dimension; and adjusting the transfer function to provide for the change in depth dimension so that the depth dimension of the target is substantially covered by the transfer function and transferred color gamut.

16. A method as in claim 15 further comprising: adjusting the transfer function by varying the gradient of the function.

* * * * *